United States Patent
O'Bleness et al.

(10) Patent No.: US 9,223,709 B1
(45) Date of Patent: Dec. 29, 2015

(54) THREAD-AWARE CACHE MEMORY MANAGEMENT

(71) Applicant: Marvell International Ltd., Hamilton (BM)

(72) Inventors: R. Frank O'Bleness, Tempe, AZ (US); Sujat Jamil, Gilbert, AZ (US); Tom Hameenanttila, Phoenix, AZ (US); Joseph Delgross, Chandler, AZ (US)

(73) Assignee: Marvell International Ltd., Hamilton (BM)

( * ) Notice: Subject to any disclaimer, the term of this patent is extended or adjusted under 35 U.S.C. 154(b) by 235 days.

(21) Appl. No.: 13/782,793

(22) Filed: Mar. 1, 2013

Related U.S. Application Data

(60) Provisional application No. 61/607,520, filed on Mar. 6, 2012.

(51) Int. Cl.
*G06F 12/08* (2006.01)

(52) U.S. Cl.
CPC .................................. *G06F 12/0864* (2013.01)

(58) Field of Classification Search
CPC .. G06F 12/08; G06F 12/0842; G06F 12/0848
USPC ......... 711/119, 129, 130, 133, 141, 144, 152, 711/E12.039; 712/229, E9.053, 228; 718/100, 102, 107
See application file for complete search history.

(56) References Cited

U.S. PATENT DOCUMENTS

| | | | |
|---|---|---|---|
| 6,205,519 B1 | 3/2001 | Aglietti et al. | |
| 6,349,363 B2 | 2/2002 | Cai et al. | |
| 6,877,067 B2* | 4/2005 | Yamazaki | 711/128 |
| 8,266,379 B2* | 9/2012 | Lee | 711/118 |
| 2002/0184445 A1* | 12/2002 | Cherabuddi | 711/130 |
| 2003/0172234 A1* | 9/2003 | Soltis, Jr. | 711/122 |
| 2004/0215882 A1* | 10/2004 | Alexander et al. | 711/128 |
| 2004/0243765 A1* | 12/2004 | Lee | 711/118 |
| 2006/0143390 A1* | 6/2006 | Kottapalli | 711/130 |
| 2007/0136530 A1* | 6/2007 | Tanaka | 711/128 |
| 2009/0187713 A1* | 7/2009 | Zedlewski et al. | 711/130 |
| 2010/0115244 A1* | 5/2010 | Jensen et al. | 712/220 |
| 2011/0225372 A1* | 9/2011 | Pirog | 711/141 |

OTHER PUBLICATIONS

Suh et al "Dynamic Partitioning of Shared Cache Memory", The Journal of Supercomputing, vol. 28 Issue 1, Apr. 2004, pp. 7-26.*
Garg et al., "Cache Design Options for a Clustered Multithreaded Architecture", University of Rochester, Computer Science Department, Aug. 2005, pp. 1-21.

* cited by examiner

*Primary Examiner* — Cheng-Yuan Tseng
*Assistant Examiner* — Kamal Dewan

(57) ABSTRACT

A cache management unit manages allocation and configuration of a cache memory that is utilized by a multi-threaded processor. In some implementations, the cache management unit is configured to determine a number of active threads being executed by the multi-threaded processor, assign a separate cache unit to each active thread when the number of active threads is equal to a maximum number of active threads supported by the multi-threaded processor, and assign more than one cache unit to an active thread when the number of active threads is less than the maximum number of active threads.

21 Claims, 5 Drawing Sheets

THREAD-AWARE CACHE MEMORY MANAGEMENT

CROSS REFERENCE TO RELATED APPLICATION

This claims the benefit of the priority under 35 U.S.C. §119(e) of U.S. Provisional Application No. 61/607,520, filed on Mar. 6, 2012, titled "Methods and Apparatus for Thread-aware Cache Partitioning," the disclosure of which is incorporated herein by reference in its entirety.

FIELD OF USE

The present disclosure relates to cache memory management in a multi-threaded processor.

BACKGROUND

A multi-threaded processor supports simultaneous execution of multiple distinct instruction sequences or threads. A thread is a stream of instructions associated with a sequence of code that has been scheduled within the multi-threaded processor. Threads being simultaneously executed by a multi-threaded processor generally share computing resources (such as execution units) of the multi-threaded processor. Although computing resources of a multi-threaded processor are shared by multiple threads, a multi-threaded processor may include multiple sets of hardware, such as a program counter and other registers, to support multiple threads. In such a case, a set of hardware is dedicated to each thread and is not shared by any other thread. Thread-specific hardware may allow a multi-threaded processor to quickly and easily switch between threads. To switch from one thread to another thread, a multi-threaded processor would switch from using one set of hardware to another set of hardware. Using dedicated, thread-specific hardware may allow each thread to simultaneously progress through its instruction sequence as much as possible. When a multi-threaded processor is executing a single thread, the processor generally uses only one of the dedicated sets of hardware. The additional dedicated sets of hardware are not used during execution of the single thread.

SUMMARY

The present disclosure describes systems and techniques relating to cache memory management in a multi-threaded processor that includes one or more cache memories that may be partitioned into one or more separate, independently accessible cache units where multiple cache units may be accessed concurrently. The cache units may be dynamically configured based on the number of active threads being executed by the multi-threaded processor.

In general, in one aspect, a cache management unit is configured to determine a number of active threads being executed by a multi-threaded processor, assign a separate cache unit to each active thread when the number of active threads is equal to a maximum number of active threads supported by the multi-threaded processor, and assign more than one cache unit to an active thread when the number of active threads is less than the maximum number of active threads.

The described systems and techniques can be implemented so as to realize none, one, or more of the following advantages. A cache management unit dynamically configures a cache memory so that no cache capacity is wasted. A cache management unit implemented in hardware may dynamically configure a cache memory much faster than a cache management unit implemented in software. Additionally, a cache management unit implemented in hardware alleviates the software development burden by eliminating the need to develop specific code that recognizes thread switch scenarios and by eliminating the need to incorporate the cache management unit into software that may be run on a processor. Dynamic configuration of cache memory units using a cache management unit implemented in hardware results in a configuration of the cache memory that is transparent to the operating system and the applications running on the multi-threaded processor.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

Details of one or more implementations are set forth in the accompanying drawings and the description below. Other features, objects, and advantages may be apparent from the description and drawings, and from the claims.

DETAILED DESCRIPTION

Figure 1:
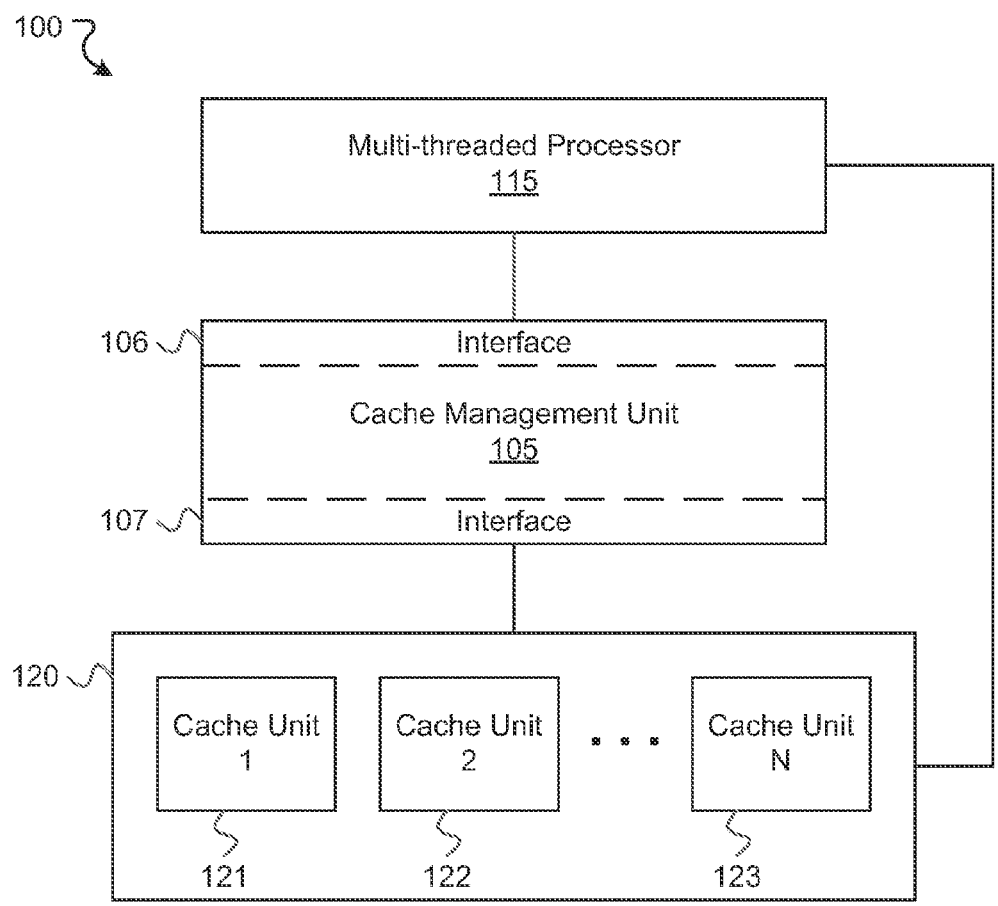
FIG. 1 is a block diagram of a multi-threaded processing system in which a cache management unit may be utilized to manage allocation and configuration of a cache memory.

Various implementations of the present disclosure are discussed below in conjunction with an example of a multi-threaded processing system 100, as shown in FIG. 1. The term "processor" as used herein includes any device in which instructions retrieved from a memory or other storage element are executed using one or more execution units. Examples of processors may therefore include microprocessors, central processing units (CPUs), very long instruction word (VLIW) processors, digital signal processors, application-specific integrated circuits (ASICs), and other types of data processing devices. The systems and techniques described in this disclosure are generally applicable to any processor or processing system in which it is desirable to manage allocation and configuration of a cache memory so that the cache memory is fully utilized by the active threads. Accordingly, FIG. 1 corresponds to some implementations of a processor, and other processor implementations may include components different than those shown in FIG. 1.

FIG. 1 is a block diagram of a multi-threaded processing system 100 in which a cache management unit 105 may be utilized to manage allocation and configuration of a cache memory 120. The multi-threaded processing system 100 may include a multi-threaded processor 115, a cache management unit 105, and a cache memory 120. The cache management unit 105 communicates with the multi-threaded processor 115 and the cache memory 120 to configure the cache memory 120. The multi-threaded processor 115 communicates with the cache memory 120 to transfer data to and from the cache memory 120.

The multi-threaded processor 115 may include processing resources such as execution units that execute instructions to perform operations or calculations on data. Some examples of execution units include an arithmetic logic unit (ALU), an integer unit, a floating point unit, a branch unit, a multiplication unit, and a division unit. Instructions that do not have conflicting processing resource requirements may be executed concurrently.

The multi-threaded processor 115 is configured to switch between a single-threaded execution mode and a multi-threaded execution mode. In the single-threaded execution mode, one thread can use all of the available processing resources. In the multi-threaded execution mode, the multi-threaded processor 115 is configured to switch execution among multiple threads. Instructions from multiple threads may be issued on each instruction cycle. Multiple threads may share the processing resources of the multi-threaded processor 115 and use different processing resources at the same time.

The multi-threaded processor 115 may maintain status information for each thread. The status information may indicate whether the thread is active or inactive. An active thread is a thread that is currently using a processing resource of the multi-threaded processor 115. An inactive thread is a thread that is not currently using a processing resource of the multi-threaded processor 115. Inactive threads may include threads that are ready to be executed, suspended, stalled, or idle.

The multi-threaded processor 115 may include multiple sets of hardware, such as a program counter and other registers, to support execution of multiple threads. Each set of hardware may be dedicated for use by an active thread. Each set of hardware may be associated with status information that indicates whether the set of hardware is being used by a thread.

The multi-threaded processor 115 may include multiple pipeline stages. In some implementations, each pipeline stage may track a thread identifier for the instruction it is processing. In some implementations, each pipeline stage may track the thread identifier of each instruction being processed by the multi-threaded processor 115.

The multi-threaded processor 115 is configured to support a maximum number of active threads. The maximum number of active threads supported by the multi-threaded processor 115 may be based on the number of sets of hardware that can each be dedicated to an active thread, the number of pipeline stages in the multi-threaded processor 115, or the number of cache memory units in the cache memory 120.

The cache memory 120 may be an instruction cache, a data cache, or a combined instruction and data cache. The cache memory 120 temporarily stores instructions, data, or both, for the multi-threaded processor 115. The cache memory 120 can be positioned between the multi-threaded processor 115 and a main memory (not shown). The cache memory 120 provides the multi-threaded processor 115 with relatively fast access to instructions or data that are stored in the cache memory 120 in comparison to the time required to obtain the instructions or data from the main memory.

The cache memory 120 may be partitioned into multiple independent high speed cache memory units, such as cache memory units 121, 122, 123. Each cache memory unit may be configured as a direct mapped cache or a set associative cache. To configure a cache memory unit to be a set associative cache, the cache memory unit is divided into two or more equal sections called cache ways.

In some implementations, a cache memory unit may be a separate cache module, such as a static random access memory (SRAM) device or a dynamic random access memory (DRAM) device. In some implementations, a cache memory unit may be a portion of the cache memory 120. For example, the cache memory 120 may be divided into separate partitions that correspond to the different cache memory units 121, 122, 123.

Each cache memory unit 121, 122, 123 may be coupled to separate address and data buses so that the cache memory units 121, 122, 123 may be accessed concurrently. Each cache memory unit 121, 122, 123 may be independently configured. Examples of attributes of cache memory units 121, 122, 123 that can be independently configured may include size, associativity, replacement policy, and update policy. For example, cache memory unit 121 may be configured to be a 2-way set associative cache while cache memory unit 122 may be configured to be a 4-way set associative cache.

The cache management unit 105 manages allocation and configuration of the cache memory 120. The cache management unit 105 includes an interface 106 for communication with the multi-threaded processor 115. The cache management unit 105 may receive status information from the multi-threaded processor 115 through the interface 106. The cache management unit 105 includes an interface 107 for communication with the cache memory 120. The cache management unit 105 may transmit allocation and configuration information to the cache memory 120 through the interface 107.

The allocation and configuration of each cache memory unit 121, 122, 123 may be based on the number of active threads being executed by the multi-threaded processor 115. The cache management unit 105 allocates the cache memory units 121, 122, 123 of the cache memory 120 to the active threads such that each cache memory unit 121, 122, 123 is being used by at least one active thread.

When allocating a cache memory unit, the cache management unit 105 may manage the configuration of the cache memory unit based on the number of active threads being assigned to the cache memory unit. For example, a cache memory unit that was previously assigned to one active thread and configured by the cache management unit 105 to be a 2-way set associative cache may be reassigned to two active threads and reconfigured to be a 4-way set associative cache, where each of the two active threads is assigned to two of the four cache ways.

The cache management unit 105 may maintain a partition mask or configuration register for each thread maintained by the multi-threaded processor 115. The partition mask or configuration register for a thread may indicate which cache memory unit or units are assigned to the thread and which cache way or ways of a cache memory unit are assigned to the thread. For example, the cache management unit 105 may assign a cache memory unit or a way of a cache memory unit to an active thread by storing a "1" in a bit position of the thread's partition mask corresponding to the assigned cache memory unit or assigned way of a cache memory unit. The cache management unit 105 may indicate that no cache memory units are assigned to an inactive thread by storing a "0" in all bit positions of the partition mask associated with the inactive thread.

When the multi-threaded processor 115 switches between single-threaded mode and multi-threaded mode, the cache management unit 105 may reallocate and reconfigure each cache memory unit. When switching from single-threaded mode to multi-threaded mode, the size of cache memory available to the thread that was executing in single-threaded mode will be reduced. The thread that was executing in single-threaded mode may be required to re-fetch any data that is stored in a cache memory unit or a portion of a cache memory unit that is reassigned to a new thread. The new thread will access its assigned cache memory unit. In some implementations, the new thread may, on a cache hit, acquire data that was stored in the cache by the thread that was executing in single-threaded mode.

Figure 2:
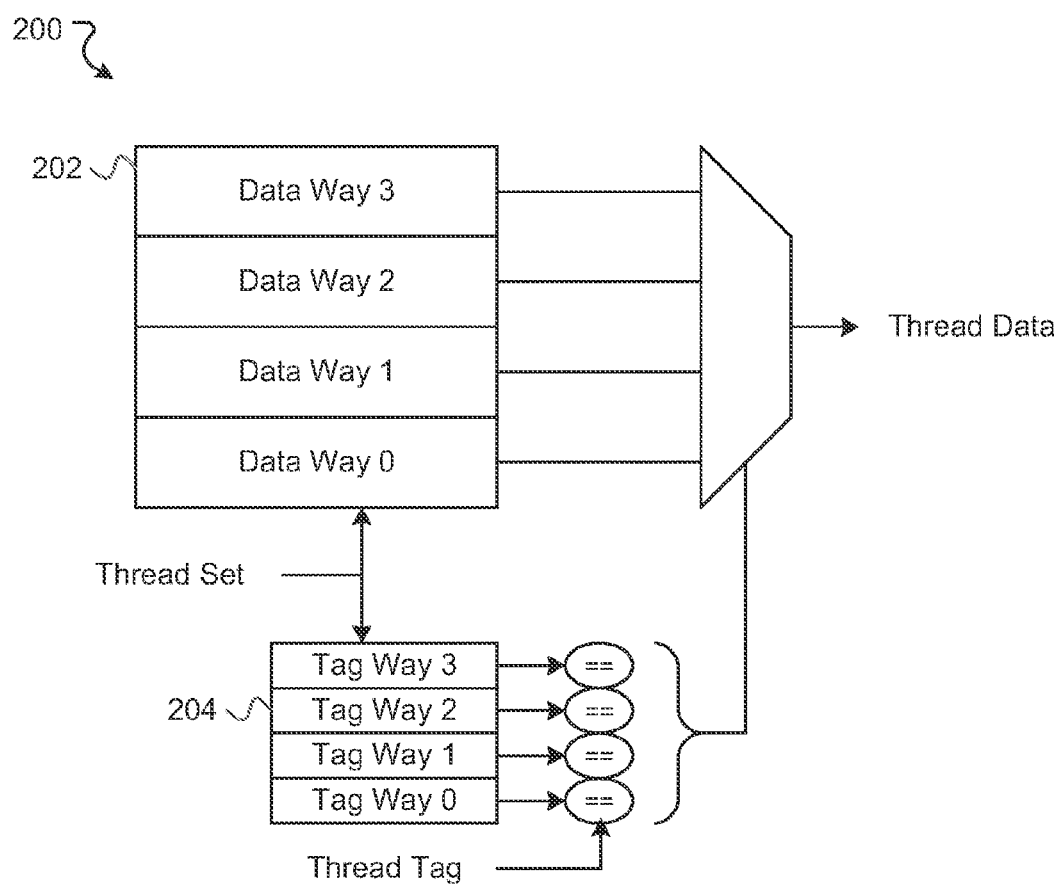
FIG. 2 is a block diagram showing an example of a cache memory unit.

FIG. 2 is a block diagram showing an example of a cache memory unit 200. The cache memory unit 200 may include a data array 202 and a tag array 204. The data array 202 stores instructions or data. The tag array 204 stores at least a part of each of the memory addresses associated with the instructions or data stored in the data array.

The cache memory unit 200 is configured as a 4-way set associative cache. To configure the cache memory unit 200 as a 4-way set associative cache, the data array 202 is divided into four equal sections, e.g., Data Way 0, Data Way 1, Data Way 2, and Data Way 3. The tag array 204 is divided into four equal sections, e.g., Tag Way 0, Tag Way 1, Tag Way 2, Tag Way 3. Each section of the data array 202 has a corresponding section of the tag array 204. Generally, for a cache memory unit that is an M-way set associative cache, the data array and the tag array are divided into M equal sections.

The cache memory unit 200 receives a memory address associated with a thread. The memory address may include a tag and a set. The set indicates the cache line of each data way that may be storing the requested data. The received tag is compared to each tag stored in the indicated cache line of each tag way of the tag array 204 to determine which cache way may be storing the requested data. If a matching tag is found, the data stored in the cache line of the cache way where the matching tag is stored is output on the Thread Data signal line.

For example, the received set indicates that cache line 0 of each data way may be storing the requested data. The received tag is compared to the tags stored in cache line 0 of Tag Way 0, cache line 0 of Tag Way 1, cache line 0 of Tag Way 2, and cache line 0 of Tag Way 3 to determine which cache way may be storing the requested data. If a matching tag is found at cache line 0 of Tag Way 3, the data stored in cache line 0 of Data Way 3 is output on the Thread Data signal line.

Figure 3:
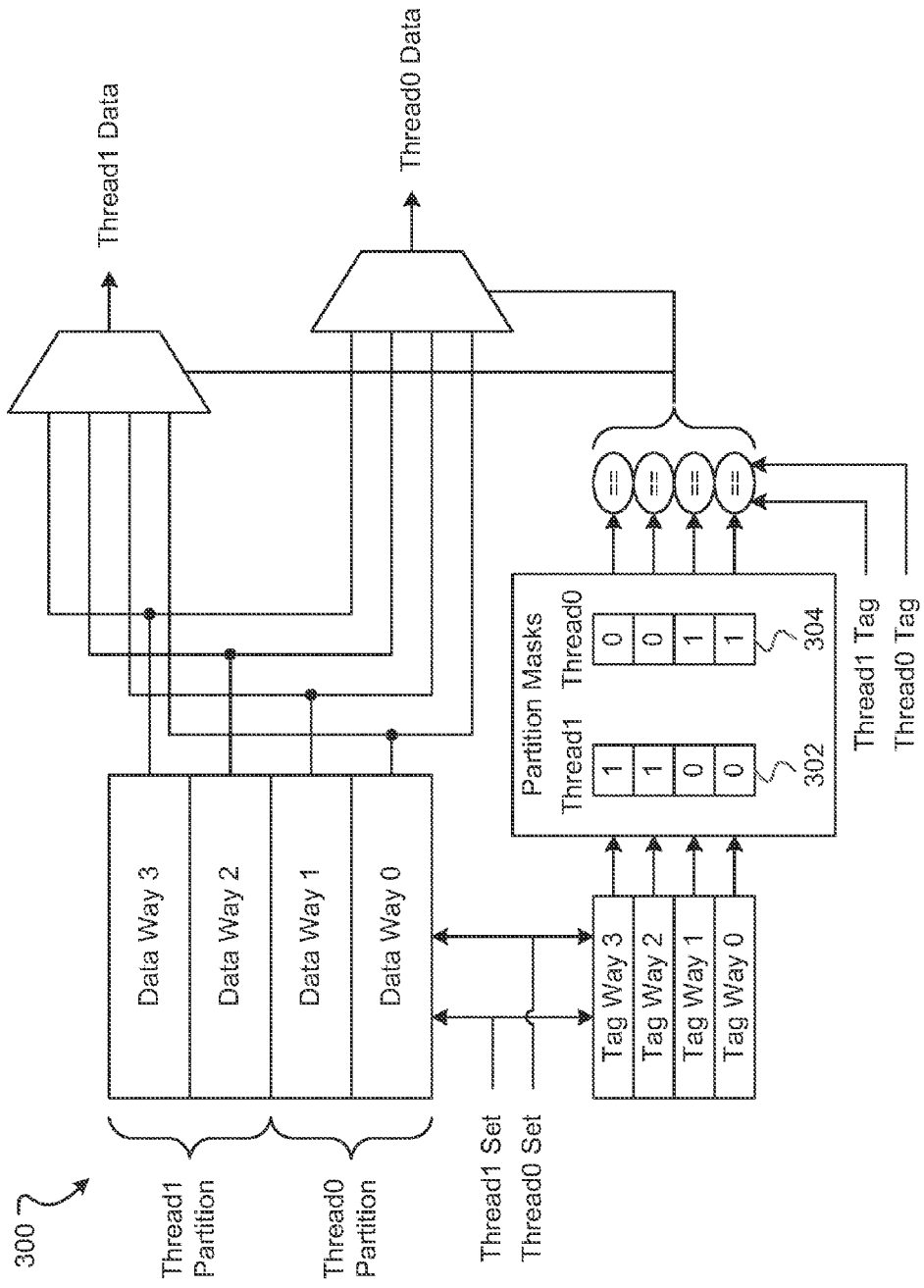
FIG. 3 is a block diagram showing an example of a cache memory unit that is allocated to two active threads.

FIG. 3 is a block diagram showing an example of a cache memory unit 300 that is allocated to two active threads, e.g., Thread0 and Thread1. The cache memory unit 300 is a 4-way set associative cache. A cache management unit may assign to each thread two of the four ways as indicated by partition masks 302 and 304. Partition mask 304 contains [0011] to assign Data Way 0 and Data Way 1 to Thread0. Partition mask 302 contains [1100] to assign Data Way 2 and Data Way 3 to Thread1.

When data for a thread is requested, the cache memory unit 300 retrieves tags stored in the tag ways indicated by the corresponding partition mask. For example, if data for Thread0 is requested, the cache memory unit 300 retrieves tags stored in Tag Way 0 and Tag Way 1. If data for Thread1 is requested, the cache memory unit 300 retrieves tags stored in Tag Way 2 and Tag Way 3. In FIG. 3, only the tags stored in the tag ways corresponding to the assigned cache ways are retrieved for comparison to the received tag, and only the data stored in the data ways corresponding to the assigned cache ways are output on the thread data signal lines, e.g., Thread0 Data and Thread1 Data.

While FIG. 3 shows the cache memory retrieving only tags stored in the tag ways indicated by the corresponding partition mask, the cache memory may alternatively retrieve tags from all of the tag ways regardless of which cache ways are assigned to a thread. The retrieve tags may be compared to the received tag, and the corresponding partition mask may be used to qualify the comparison results. Other implementations are possible.

While FIG. 3 shows the cache memory unit 300 being allocated to two active threads, a cache memory unit may be allocated to any number of active threads up to the maximum number of threads for a given implementation. For example, to allocate the cache memory unit to a single active thread, e.g., Thread0, the partition mask 304 for Thread0 would contain [1111] and the partition mask 302 for Thread1 would contain [0000] to indicate that the cache memory unit 300 is fully assigned to Thread0.

Other allocations of a cache memory unit among active threads are possible. For example, a cache way may be shared by two threads. In FIG. 3, if the partition mask 302 for Thread1 contained [1110] and the partition mask 304 for Thread0 contained [0111], Data Way 1 and Data Way 2 would be shared by Thread0 and Thread1, Data Way 0 would be dedicated to Thread0, and Data Way 3 would be dedicated to Thread1. Sharing of a cache way by multiple threads may be implemented according to hardware-based replacement policies.

As another example, each active thread may be allocated a different number of cache ways. In FIG. 3, if the partition mask 302 for Thread1 contained [1000] and the partition mask 304 for Thread0 contained [0111], Thread1 would be assigned Data Way 3, and Thread0 would be assigned Data Way 0, Data Way 1, and Data Way 2.

Figure 4:
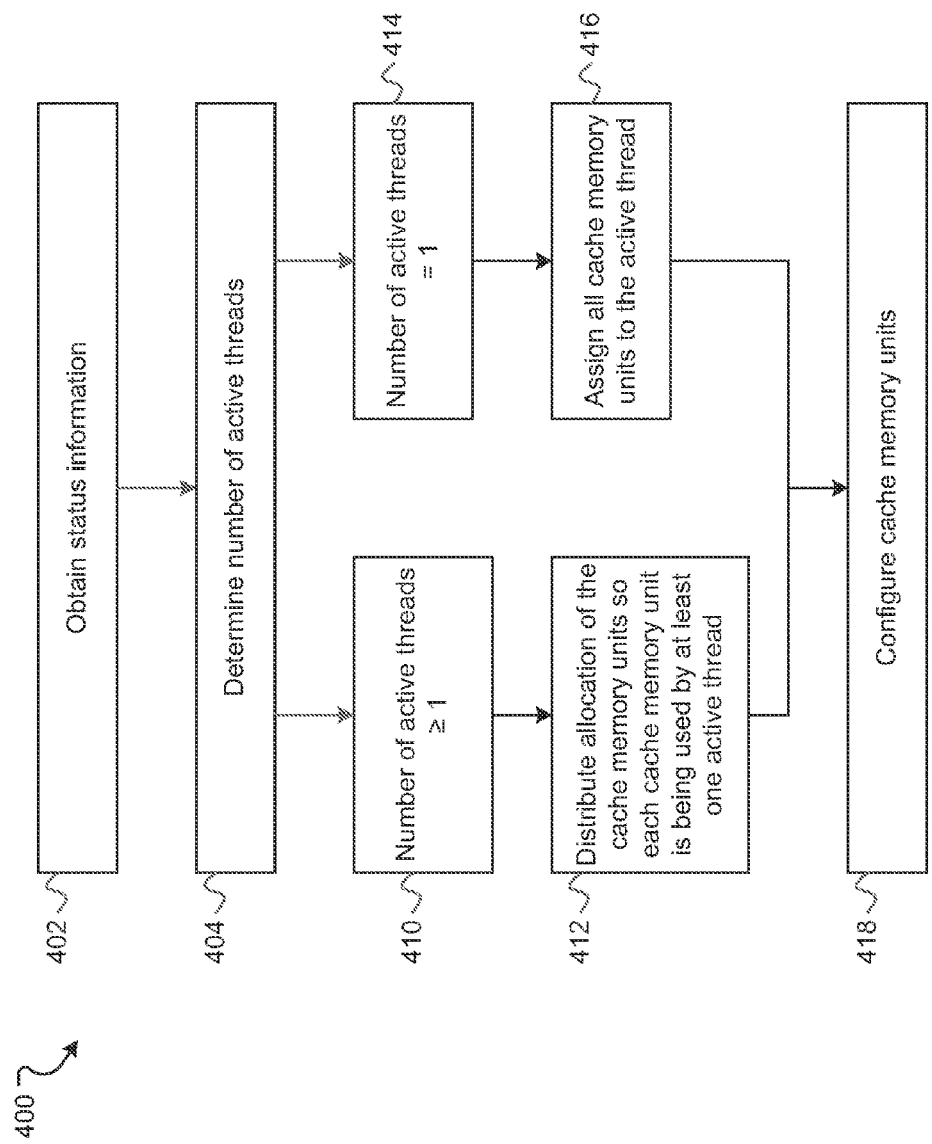
FIG. 4 is a flowchart showing examples of operations performed by a cache management unit to manage allocation and configuration of a cache memory.

FIG. 4 is a flowchart showing examples of operations 400 performed by a cache management unit, such as the cache management unit 105 of FIG. 1, to manage allocation and configuration of a cache memory, such as the cache memory 120 of FIG. 1. At 402, the cache management unit obtains status information from a multi-threaded processor. In some implementations, the cache management unit may obtain status information for each thread maintained by the multi-threaded processor. The status information may indicate whether the thread is active or inactive. In some implementations, the cache management unit may obtain status information that indicates which sets of hardware are being used by a thread. A status indicating that a set of hardware is being used by a thread may indicate that the thread using the set of hardware is an active thread.

At 404, the cache management unit determines the number of active threads being executed by the multi-threaded processor. The cache management unit may make this determination based on the status information received from the multi-threaded processor. From the thread status information, the cache management unit may count the number of active threads. From the hardware status information, the cache management unit may count the number of sets of hardware being used by a thread.

At 410, the cache management unit determines that the number of active threads is greater than one, which indicates that the multi-threaded processor is operating in multi-threaded execution mode. In multi-threaded execution mode, the number of active threads may be the maximum number of threads supported by the multi-threaded processor or between the maximum number of supported threads and one. When the cache management unit determines that the number of active threads is greater than one, the cache management unit distributes allocation of the cache memory units so that each cache memory unit is being used by at least one active thread at 412. As a result, one or more cache units may be assigned to an active thread.

FIGS. 5-8 show examples of the assignment of cache memory units to active threads when the number of active threads is greater than one. In the examples of FIGS. 5-8, a cache memory is partitioned into a fixed number of cache memory units that include Cache Unit 1, Cache Unit 2, and Cache Unit 3. The maximum number of threads supported by the multi-threaded processor may be equal to the number cache memory units. Each cache unit in FIGS. 5-8 is coupled to separate address and data buses so that the Cache Units 1, 2, and 3 may be accessed concurrently.

Figure 5:
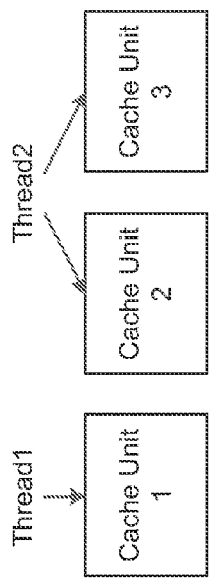
FIGS. 5-9 show examples of the assignment of cache memory units to active threads.

FIG. 5 shows an example of the assignment of cache memory units to active threads when the number of active threads is equal to the number of cache memory units. In FIG. 5, each active thread is assigned to a separate cache memory unit. Thread1 is assigned to Cache Unit 1. Thread2 is assigned to Cache Unit 2. Thread3 is assigned to Cache Unit 3.

Figure 6:
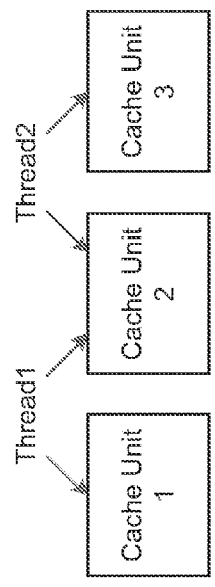

FIG. 6 shows another example of the assignment of cache memory units to active threads when the number of active threads is equal to the number of cache memory units. In FIG. 6, each active thread is assigned one or more cache units. Thread1 is assigned to one dedicated cache memory unit, Cache Unit 1, and one shared cache memory unit, Cache Unit 2. Thread2 is assigned a shared cache memory unit, Cache Unit 2. Thread3 is assigned to Cache Unit 3. The cache management unit may configure the associativity or other attributes of Cache Unit 2 so that it can be shared by Thread1 and Thread2. When a cache memory unit is shared by multiple active threads, each active thread sharing the cache memory unit may be assigned one or more cache ways of the cache memory unit, as shown in the example of FIG. 3.

Assignments of cache memory units to active threads different from the examples shown in FIGS. 5 and 6 are possible. For example, Thread1 may be assigned to Cache Unit 1 and Cache Unit 2, Thread2 may be assigned to Cache Unit 2 and Cache Unit 3, and Thread3 may be assigned to Cache Unit 3.

Figure 7:

FIG. 7 shows an example of the assignment of cache memory units to active threads when the number of active threads is less than the number of cache memory units. In FIG. 7, Thread1 is assigned one cache memory unit, Cache Unit 1. Thread2 is assigned two cache memory units, Cache Unit 2 and Cache Unit 3.

Figure 8:

FIG. 8 shows another example of the assignment of cache memory units to active threads when the number of active threads is less than the number of cache memory units. In FIG. 8, Thread1 is assigned one dedicated cache memory unit, Cache Unit 1, and one shared cache memory unit, Cache Unit 2. Thread2 is assigned one dedicated cache memory unit, Cache Unit 3, and one shared cache memory unit, Cache Unit 2. The cache management unit may configure the associativity or other attributes of Cache Unit 2 so that it can be shared by Thread1 and Thread2. When a cache memory unit is shared by multiple active threads, each active thread sharing the cache memory unit may be assigned one or more cache ways of the cache memory unit, as shown in the example of FIG. 3.

Assignments of cache memory units to active threads different from the examples shown in FIGS. 7 and 8 are possible. For example, Thread1 may be assigned to Cache Unit 1, Cache Unit 2, and Cache Unit 3, and Thread2 may be assigned Cache Unit 3.

The cache management unit may assign cache memory units to active threads based on, e.g., the memory requirements of the active threads. For example, the cache management unit may monitor memory accesses by each thread over a certain time period. If one thread has a higher number of memory accesses than another thread, which indicates that the thread having the higher number of accesses may require more capacity, the cache management unit may assign the cache units to the active threads such that more cache memory units are available to the thread having the higher number of accesses.

Returning to FIG. 4 at 414, the cache management unit determines that the number of active threads is equal to one, which indicates that the multi-threaded processor is operating in a single-threaded execution mode. When the cache management unit determines that the number of active threads is equal to one, the cache management unit assigns all cache memory units to the active thread at 416.

Figure 9:
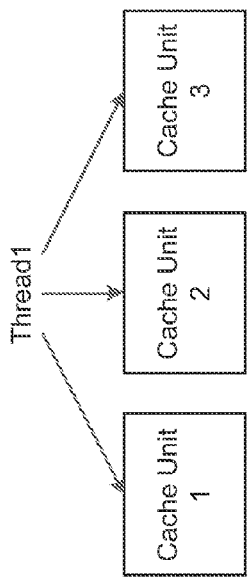

FIG. 9 shows an example of the assignment of cache memory units to an active thread when the number of active threads is equal to one. In FIG. 9, Thread1 is assigned to all cache memory units, which includes Cache Unit 1, Cache Unit 2, and Cache Unit 3. In each of the examples shown in FIGS. 5-9, each cache memory unit is being used by at least one active thread. In each of the examples shown in FIGS. 6-9, which correspond to the number of active threads being less than the number of cache memory units, at least one active thread is assigned to more than one cache unit.

While FIGS. 5-9 show a fixed number of cache memory units being assigned to active threads, the cache management unit may dynamically partition a cache memory into any number of cache memory units based on the number of active threads. In such an implementation, the cache management unit may partition the cache memory such that the number of cache memory units equals the number of active threads. Each cache memory unit is coupled to separate address and data buses so that the cache units may be accessed concurrently. The cache management unit may configure the size of a cache memory unit based on the memory requirements of the active thread assigned to the cache memory unit. For example, the cache management unit may monitor memory accesses by each thread over a certain time period. If one thread has a higher number of memory accesses than another thread, which indicates that the thread having the higher number of accesses may require more capacity, the cache management unit may configure the cache units such that more capacity is available to the thread having the higher number of accesses.

Returning to FIG. 4, the cache management unit configures the cache memory units at 418. The cache management unit may configure the size, associativity, replacement policy, update policy, or other attributes of the cache memory units. The cache management unit may configure the cache memory units based on the number of active threads that are assigned to the cache unit. For example, the cache management unit may increase the number of cache ways of a cache memory unit when the number of active threads assigned to the cache memory unit increases. Similarly, the cache management unit may decrease the number of cache ways of a cache memory unit when the number of active threads assigned to the cache memory unit decreases. Other configurations of a cache memory unit are possible.

The cache management unit described above may be implemented in electronic circuitry, computer hardware, firmware, software, or in combinations of them, such as the structural means disclosed in this specification and structural equivalents thereof, including system on chip (SoC) implementations. Implementing a cache management unit in electronic circuitry or computer hardware may provide advantages over implementing the cache management unit in software. For example, a cache management unit implemented in hardware may reallocate the cache memory units faster than a cache management unit implemented in software. As another example, reallocation of the cache memory units using a cache management unit implemented in hardware results in an allocation of the cache memory that is transparent to the operating system and the applications running on the multi-threaded processor.

A few implementations have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations. Other implementations fall within the scope of the following claims.

What is claimed is:

1. A method comprising:
   determining a number of active threads being executed by a multi-threaded processor;
   assigning, to each active thread of a plurality of active threads, a separate cache unit of a plurality of cache units when the number of active threads is equal to a maximum number of active threads supported by the multi-threaded processor, wherein the plurality of cache units are concurrently accessible by the multi-threaded processor;
   assigning, to an active thread of one or more active threads, more than one cache unit of the plurality of cache units when the number of active threads is less than the maximum number of active threads;
   storing a mask for each active thread to indicate which one or more cache units of the plurality of cache units are assigned to that active thread;
   receiving a request for data for an active thread;
   determining which one or more tag ways are associated with the one or more cache units assigned to the active thread for which the request was received based on the mask stored for the active thread for which the request was received;
   retrieving tags stored in the one or more tag ways indicated by the mask stored for the active thread for which the request was received;
   determining which cache unit of the one or more cache units assigned to the active thread is to provide the data requested by the active thread based on the retrieved tags; and
   providing the data from the determined cache unit.

2. The method of claim 1, wherein determining a number of active threads being executed by a multi-threaded processor comprises:
   obtaining status information associated with each thread maintained by the multi-threaded processor; and
   determining the number of active threads being executed by the multi-threaded processor based on the status information.

3. The method of claim 1, wherein:
   the multi-threaded processor comprises a plurality of sets of hardware, wherein each set of hardware of the plurality of sets of hardware is dedicated to an active thread; and
   determining a number of active threads being executed by a multi-threaded processor comprises
      obtaining status information associated with each set of hardware of the plurality of sets of hardware, and
      determining the number of active threads being executed by the multi-threaded processor based on the status information.

4. The method of claim 1, wherein the maximum number of active threads supported by the multi-threaded processor is equal to a number of cache units that are concurrently accessible by the multi-threaded processor.

5. The method of claim 1, wherein assigning more than one cache unit of the plurality of cache units to an active thread when the number of active threads is less than the maximum number of active threads comprises:
   assigning all cache units of the plurality of cache units to the active thread when the number of active threads is equal to one; and
   distributing allocation of the plurality of cache units among the plurality of active threads so that each cache unit of the plurality of cache units is being used by at least one active thread of the plurality of active threads when the number of active threads is greater than one.

6. The method of claim 1, wherein assigning more than one cache unit of the plurality of cache units to an active thread when the number of active threads is less than the maximum number of active threads comprises:
   assigning a cache unit of the plurality of cache units to the active thread; and
   assigning one or more cache ways of another cache unit of the plurality of cache units to the active thread.

7. The method of claim 1, further comprising:
   configuring an associativity of a cache unit of the plurality of cache units based on a number of active threads that are assigned to the cache unit.

8. An apparatus comprising:
   a processor interface configured to communicate with a multi-threaded processor, the processor being configured to support a maximum number of active threads;
   a memory interface configured to communicate with a plurality of cache units, the plurality of cache units being configured to be concurrently accessible; and
   circuitry configured to
      determine a number of active threads being executed by the multi-threaded processor,
      assign, to each active thread of a plurality of active threads, a separate cache unit of the plurality of cache units when the number of active threads is equal to the maximum number of active threads supported by the multi-threaded processor, assign, to an active thread of one or more active threads, more than one cache unit of the plurality of cache units when the number of active threads is less than the maximum number of active threads, store a mask for each active thread to indicate which one or more cache units of the plurality of cache units are assigned to that active thread, receive a request for data for an active thread, determine which one or more tag ways are associated with the one or more cache units assigned to the active thread for which the request was received based on the mask stored for the active thread for which the request was received, retrieve tags stored in the one or more tag ways indicated by the mask stored for the active thread for which the request was received, determine which cache unit of the one or more cache units assigned to the active thread is to provide the data requested by the active thread based on the retrieved tags, and provide the data from the determined cache unit.

9. The apparatus of claim 8, wherein the circuitry is configured to:

obtain status information associated with each thread maintained by the multi-threaded processor; and determine the number of active threads being executed by the multi-threaded processor based on the status information.

10. The apparatus of claim 8, wherein the circuitry is configured to:

obtain status information associated with each set of a plurality of sets of hardware, wherein each set of hardware is dedicated to an active thread; and determine the number of active threads being executed by the multi-threaded processor based on the status information.

11. The apparatus of claim 8, wherein the maximum number of active threads supported by the multi-threaded processor is equal to a number of the plurality of cache units.

12. The apparatus of claim 8, wherein the circuitry is configured to:

assign all cache units of the plurality of cache units to the active thread when the number of active threads is equal to one; and distribute allocation of the plurality of cache units among the plurality of active threads so that each cache unit of the plurality of cache units is being used by at least one active thread of the plurality of active threads when the number of active threads is greater than one.

13. The apparatus of claim 8, wherein the circuitry is configured to:

assign a cache unit of the plurality of cache units to the active thread; and assign one or more cache ways of another cache unit of the plurality of cache units to the active thread.

14. The apparatus of claim 8, wherein the circuitry is configured to:

configure an associativity of a cache unit of the plurality of cache units based on a number of active threads that are assigned to the cache unit.

15. A system comprising:

a multi-threaded processor configured to support a maximum number of active threads;

a plurality of cache units configured to be concurrently accessible by the multi-threaded processor; and a cache management unit coupled with the multi-threaded processor and the plurality of cache units, the cache management unit configured to determine a number of active threads being executed by the multi-threaded processor, assign, to each active thread of a plurality of active threads, a separate cache unit of the plurality of cache units when the number of active threads is equal to the maximum number of active threads supported by the multi-threaded processor, assign, to an active thread of one or more active threads, more than one cache unit of the plurality of cache units when the number of active threads is less than the maximum number of active threads, store a mask for each active thread to indicate which one or more cache units of the plurality of cache units are assigned to that active thread, receive a request for data for an active thread, determine which one or more tag ways are associated with the one or more cache units assigned to the active thread for which the request was received based on the mask stored for the active thread for which the request was received, retrieve tags stored in the one or more tag ways indicated by the mask stored for the active thread for which the request was received, determine which cache unit of the one or more cache units assigned to the active thread is to provide the data requested by the active thread based on the retrieved tags, and provide the data from the determined cache unit.

16. The system of claim 15, wherein the cache management unit is configured to:

obtain status information associated with each thread maintained by the multi-threaded processor; and determine the number of active threads being executed by the multi-threaded processor based on the status information.

17. The system of claim 15, further comprising:

a plurality of sets of hardware, wherein each set of hardware of the plurality of sets of hardware is dedicated to an active thread, wherein the cache management unit is configured to obtain status information associated with each set of hardware of the plurality of sets of hardware, and determine the number of active threads being executed by the multi-threaded processor based on the status information.

18. The system of claim 15, wherein the maximum number of active threads supported by the multi-threaded processor is equal to a number of the plurality of cache units.

19. The system of claim 15, wherein the cache management unit is configured to:

assign all cache units of the plurality of cache units to the active thread when the number of active threads is equal to one; and distribute allocation of the plurality of cache units among the plurality of active threads so that each cache unit of the plurality of cache units is being used by at least one active thread of the plurality of active threads when the number of active threads is greater than one.

20. The system of claim 15, wherein the cache management unit is configured to:

assign a cache unit of the plurality of cache units to the active thread; and assign one or more cache ways of another cache unit of the plurality of cache units to the active thread.

21. The system of claim 15, wherein the cache management unit is configured to:

configure an associativity of a cache unit of the plurality of cache units based on a number of active threads that are assigned to the cache unit.

\* \* \* \* \*